Patented Apr. 19, 1949

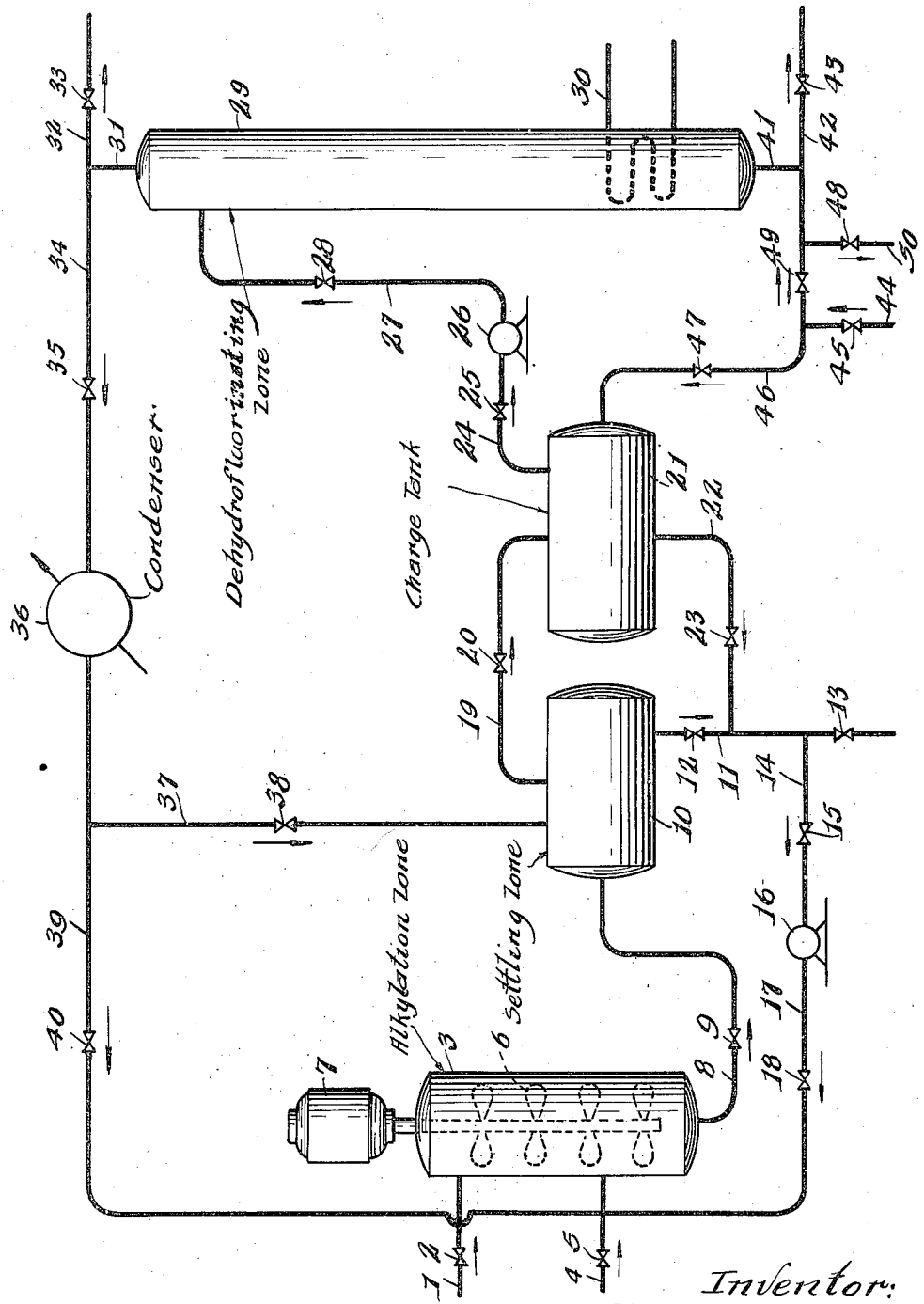

2,467,484

UNITED STATES PATENT OFFICE 2,467,484

METHOD OF REGENERATING DEHYDROFLUORINATING CATALYSTS

Elmer R. Kanhofer, Riverside, Ill., assignor to Universal Oil Products Company, Chicago, Ill., a corporation of Delaware Application July 30, 1945, Serial No. 607,905

4 Claims. (Cl. 252—411)

1

This invention relates to a process for restoring the catalytic activity of dehydrofluorinating agents used to treat the products resulting from hydrogen fluoride and other active fluoride catalyzed hydrocarbon conversion processes. More specifically, the present invention concerns the novel use of particular reagents for the regeneration of metal dehydrofluorinating catalysts.

The alkylation of paraffins, particularly branched chain paraffins, such as isobutane, isopentane, etc., the aromatic or condensed-ring aromatic compounds, such as benzene, toluene, naphthalene, and their derivatives, such as the hydroxy, amino and alkyl derivatives with olefins, such as propylene, butylene, amylene, etc., to produce saturated liquid hydrocarbons utilizable as motor fuels (particularly as components of aviation gasoline), and as synthetic chemicals useful in the chemical industries has assumed widespread commercial importance. Active fluoride catalysts, including both anhydrous and aqueous hydrogen fluoride, or mixtures of hydrogen fluoride with boron fluoride, alkyl fluorides, metal fluorides, etc., are utilized in the alkylation of isoparaffins with olefins, but it has been found that the resultant alkylation product frequently contains minor quantities of fluorine in combination with the hydrocarbons, possibly as a result of the interaction of hydrogen fluoride with the olefinic constituent of the reaction mixture under the influence of the catalyst.

Although the fluorine content of the alkylate is rarely very high, its presence in the alkylation product is undesirable. It has been found that the fluorine in alkylation products is definitely objectionable because of its corrosive character, its detrimental effect on the antiknock properties of gasoline containing the same, and its tendency to readily react with various substances with which it comes into contact, forming thereby undesirable products which may result in plugging of pipe lines, etc.

Not only is the removal of fluorine from the hydrocarbon products important for the above reasons, but also the decomposition of the combined fluorine compounds is important in that the combined fluorine represents a loss of hydrogen fluoride, since it is no longer available for use as the catalyst. It recently has been proposed to treat such hydrocarbon products obtained in hydrogen fluoride-catalyzed reactions and containing the combined fluorides, with various metallic dehydrofluorinating catalysts, and preferably such materials as aluminum metal,

2 desirably etched to roughen the surfaces thereof, alloys such as those of aluminum with copper, iron, lead, or other metals, aluminum coated or surfaced materials, such as carbon rings sprayed with aluminum, etc., as well as other metals such as iron, copper, zinc, etc.

In the operation of a typical dehydrofluorinating process utilizing, for example, etched aluminum metal rings as the dehydrofluorinating catalyst, the hydrocarbon layer of the alkylation product previously separated from the catalyst layer, is introduced at the proper reaction conditions specified below into a dehydrofluorinating zone. The dehydrofluorinating zone may comprise a tower or vessel packed with the aluminum rings through which the alkylate is passed to effect dehydrofluorination, but preferably is equipped with vapor take-off lines and condensers so that the apparatus may serve also as a fractionating tower in which the aluminum rings of proper shape and size are disposed to act as a vapor-liquid contact surface for fractionation, thus replacing in part or in whole such contacting means as bubble trays or decks, baffle plates, side-to-side pans, etc., which normally are employed in conventional fractionating towers. The aluminum catalyst is preferably formed into a shape such that good vapor and liquid contact is accomplished and also free flow of vapor and liquid streams is permitted through the dehydrofluorinating zone. The operation of such columns, the temperatures and pressures employed, and other factors involved in the operation such as the means for effecting contact of the hydrocarbon product with the aluminum rings are now known to the art and need not be repeated here.

In the operation of such dehydrofluorinating processes, wherein the products of alkylation are introduced into a dehydrofluorinating tower packed with metallic catalysts, a major problem for continuous operation has arisen because of the metallic catalyst becoming gradually coated with a cohesive, organic solvent-resistant, varnish-like resinous product. The resinous byproduct deposited on the dehydrofluorinating catalyst is in itself non-catalytic for accomplishing the desired results, and in fact, deactivates the metallic packing material for further dehydrofluorination. Since, the use of metallic materials for effecting dehydrofluorination of alkylation products is a relatively recent innovation in the art, the above problem has been of recent origin and no effective means has as yet been applied for removing the varnish from the catalyst after its formation. I have found that metallic catalysts which have been used for dehydrofluorinating alkylation products and which have been deactivated by the resinous coating may be reactivated by contacting the catalyst with liquid, substantially anhydrous, hydrogen fluoride, with a reagent comprising hydrogen fluoride admixed with hydrocarbons, or with hydrogen chloride, either in the anhydrous state or in an aqueous hydrochloric acid solution.

It is one object of my invention, therefore, to provide a means for reactivating a metallic dehydrofluorinating catalyst upon which an inactive varnish-resin has been deposited during an active fluoride-catalyzed conversion process.

Another object of my invention is to remove the inactive varnish resins from metallic dehydrofluorinating catalysts deposited on the surface thereof during treatment of the products from a hydrogen fluoride-catalyzed conversion process by subjecting said deactivated dehydrofluorinating catalyst to the action of a reagent comprising liquid anhydrous hydrogen fluoride, a hydrogen fluoride-hydrocarbon mixture, or an anhydrous or aqueous hydrogen chloride.

It is still another object of my invention to supply anhydrous, liquid hydrogen fluoride or a hydrocarbon in admixture with the same or an anhydrous or aqueous hydrogen chloride reagent under conditions such that said reagent will remain in the liquid state to a dehydrofluorinating zone containing a metal dehydrofluorinating catalyst to dissolve therefrom the inactive varnish-resin.

In one embodiment the present invention comprises contacting aluminum catalysts which have become deactivated by the deposition thereon of a varnish-like resin formed by treating the products resulting from a hydrogen fluoride alkylation process with a reagent containing anhydrous hydrogen fluoride.

One specific embodiment of my invention comprises contacting a deactivated aluminum dehydrofluorinating catalyst with anhydrous liquid hydrogen fluoride at a temperature within the range of from about 0° to about 200° C., and at a super-atmospheric pressure sufficient to maintain the reagent in liquid phase at the temperature of reactivation.

The total effluent products of the hydrogen fluoride or other active fluoride-catalyzed reactions are usually separated into an organic product layer and a spent catalyst layer, usually by simple decantation. Because of the solubility of hydrogen fluoride in the product layer, the latter will contain not only the organically combined fluorides formed in the reaction, but also considerable quantities of dissolved catalyst. In order to eliminate the undesirable combined fluorides and dissolved catalyst from the product, a dehydrofluorinating tower is employed in the process, where the dissolved catalyst is vaporized or flashed off from the product and the combined fluorides are decomposed, usually with the assistance of a dehydrofluorinating catalyst such as an aluminum-containing metal. For the purpose of the present specifications, the description of the operation of a typical dehydrofluorinating tower will be limited to a hydrogen fluoride catalyzed alkylation reaction.

The dehydrofluorinating tower, as commercially operated, in a hydrogen fluoride catalyzed alkylation process is usually maintained at a temperature of from about 75° to about 250° C. at the point of introducing the hydrocarbon layer into the tower. The pressure employed within the tower is generally of from about substantially atmospheric to as high as 100 atmospheres, the specific conditions employed depending primarily upon the reactants charged into the alkylation reactor. Under the usual temperature and pressure conditions employed in the dehydrofluorinating tower a major proportion of the aluminum dehydrofluorinating catalyst is never contacted by the free hydrogen fluoride contained in the hydrocarbon layer, since the charge is introduced into the upper portion of the tower and is immediately vaporized or flashed off without ever entering the lower portion of the dehydrofluorinating tower. The resin adhering to the aluminum dehydrofluorinating catalyst, however, is not vaporized under these conditions. Under the operating conditions herein specified for removing the varnish resin formed during a hydrogen fluoride catalyzed conversion reaction on an aluminum dehydrofluorinating catalyst, the specified time and temperature conditions, as well as the composition of the reagent employed in reactivation, are sufficient to remove a substantial portion of the resin adhering to the dehydrofluorinating catalyst. In the reactivation procedure the resin is carried out of the dehydrofluorinating tower either dissolved in or reacted with the reagent as herein specified and may be disposed of by any suitable means such as by evaporating the reagent from the resin with recovery or reuse of the reagent, if desired. A further significant advantage of the present reagent is the fact that it does not introduce into the system a foreign reagent incompatible with the alkylation catalyst or a material which will dilute or react with the alkylation catalyst.

According to a preferred operation, an aluminum-containing dehydrofluorinating catalyst which has been deactivated by continuous service in dehydrofluorinating operations is contacted in situ with a reagent containing anhydrous liquid hydrogen fluoride at a temperature of from about 0° to about 200° C., and at a suitable pressure sufficient to maintain the reagent in liquid phase for a period of time of from about 1 hour to about 20 hours or more, depending upon the quantity of deactivating material adhering to the dehydrofluorinating catalyst. The conditions of operation, such as temperature, pressure, contact-time, etc. are selected for any given operation on the basis of the designed limitations of the dehydrofluorinating tower. Usually, a temperature below about 200° C. will be sufficient to cause desired reactivation within a reasonable period of time. Generally, however, the temperature is maintained at as high a level as is consistent with the limitations of the dehydrofluorinating tower. The herein specified reagent for effecting reactivation of dehydrofluorinating catalysts may be substantially anhydrous hydrogen fluoride, preferably containing not more than 2 per cent water, a mixture of a hydrocarbon and hydrogen fluoride, such as a hydrocarbon containing hydrogen fluoride dissolved therein, (as, for example, a saturated solution of hydrogen fluoride in isobutane), or it may consist of aqueous or anhydrous hydrogen chloride. Generally, however, substantially anhydrous hydrogen fluoride or hydrogen chloride is preferred, because of the non-corrosiveness of these reagents on dehydrofluorinating catalysts. Nevertheless, under some conditions the mixed hydrocarbon-hydrogen fluoride or aqueous hydrogen chloride reagent may be employed to advantage, especially when it is desirable to operate the reactivation at a high temperature.

Aqueous hydrochloric acid solutions which may be utilized to effect reactivation of metal dehydrofluorinating catalysts preferably are of greater strength than about 0.5 normality, since hydrochloric acid below this concentration is not sufficiently active to accomplish the reactivation within a reasonable period of time.

The dehydrofluorinating catalysts, such as the above specified metals or their alloys are preferably reactivated before the catalyst has been exposed to oxygen or air since the resinous deactivating material on the surface of the dehydrofluorinating catalyst is readily oxidized, and on oxidation is converted to a material which is more resistant to the action of the reactivating agent of the present invention. A typical procedure for reactivating dehydrofluorinating catalysts which embodies these principles comprises soaking or washing the deactivated catalyst with the present reagent while the latter is in the dehydrofluorinating tower. Thus, the reagent may be pumped into the tower and allowed to stand in contact with the catalyst for the required period of time, after which the reagent is allowed to drain from the tower, carrying in solution the deactivating varnish resin. In another mode of operation the present reagent may be continuously pumped over the deactivated catalyst (with intermediate purification, if desired) until substantially all of the deactivating material is removed. The latter continuous method is a more rapid and usually a more thorough procedure, especially when fresh reagent is supplied continuously.

It is possible with the present methods of reactivating dehydrofluorinating catalysts to employ two dehydrofluorinating towers in parallel so that the catalyst in one tower may be regenerated while the other is in operation. Thus, continuous dehydrofluorination may be effected without interruption of the principal process.

The character of the present invention and its applicability is further understood by referring to the accompanying diagrammatic drawing which illustrates a typical hydrogen fluoride-catalyzed alkylation process in its most essential details, and also the elements of the present invention in their relation to the overall process. The means for recovery of the products, catalysts, etc. have been intentionally omitted from the diagram for the sake of simplicity, since the means of recovery is of no direct consequence in explaining the operation of the present invention.

Referring to the drawing, the charging stock which, in the case here illustrated, comprises isobutane and butylenes, is introduced to the process at a suitable temperature and pressure through line 1 containing valve 2 and is supplied to alkylation reaction zone 3. Usually the charging stock will contain n-butane which hydrocarbon mixture is known in the art as a "B-B" fraction. Hydrogen fluoride, likewise at a suitable temperature and pressure, is introduced into zone 3 through line 4 containing valve 5. Zone 3 may comprise any suitable alkylation zone and is illustrated as a mechanically agitated reaction zone containing stirring mechanism 6 driven by motor 7. Alkylation of isobutane with butylene is usually effected at a temperature of below about 100° C. and preferably from about 10° to about 50° C. and generally at a pressure sufficient to maintain the reactants in liquid phase, which pressure is usually less than 200 pounds per square inch and more particularly about 75 to 125 pounds per square inch.

The effluent products are withdrawn from zone 3 through line 8 and valve 9 to settling zone 10. In zone 10 a hydrocarbon layer separates from the catalyst or acid layer, the catalyst layer being withdrawn from zone 10 through line 11 containing valve 12 and it may be removed from the process, all or in part, through valve 13. Preferably, however, at least a proportion thereof is recycled by way of line 14, valve 15, pump 16, line 17, valve 18, and line 4 to reaction zone 3 for further use therein. Usually a regulated portion of the acid layer withdrawn from zone 10 is supplied to a regenerating system, not shown, wherein hydrogen fluoride is recovered and wherefrom it is recycled to reaction zone 3. The acid for regeneration may be withdrawn through line 11 in regulated amounts by control of valve 13.

The upper hydrocarbon layer is withdrawn from zone 10 through line 19 and valve 20 into charging tank 21. Additional small quantities of hydrogen fluoride may settle out in tank 21 and may be directed through line 22 containing valve 23 into line 11, wherefrom it may be removed from the process, recycled to zone 3, or subjected to regeneration in the manner hereinbefore set forth.

The hydrocarbon reaction products in charging tank 21 will contain dissolved hydrogen fluoride as well as organically combined fluorine compounds. The reaction products are directed through line 24 containing valve 25 and pump 26, by means of which they are increased to the desired pressure and directed through line 27 and valve 28 into dehydrofluorinating zone 29.

Zone 29 contains a suitable dehydrofluorinating agent, such as aluminum rings, and is provided with reboiler 30, positioned in the lower portion thereof, through which any suitable heating medium, such as steam or the like, may be passed. Dehydrofluorination is usually effected at a pressure between 200 and 250 pounds per square inch, but higher or lower pressures may be employed. The temperatures employed in the dehydrofluorinating zone generally will be between about 75° and 250° C. Under these conditions substantially all of the dissolved hydrogen fluoride is stripped from the hydrocarbons, a substantial proportion of the organically combined fluorine compounds is decomposed, and the resultant chemically liberated hydrogen fluoride, along with the dissolved hydrogen fluoride, are removed.

Hydrogen fluoride is removed from zone 29 through line 31 and may be withdrawn from the process through line 32 containing valve 33, but preferably at least a portion thereof is directed through line 34 containing valve 35, condenser or cooler 36, and is recycled either through line 37 and valve 38 to settling zone 10, from which it is supplied in the manner hereinbefore set forth to reaction zone 3, or the hydrogen fluoride may be recycled through line 39, valve 40 and line 4 direct to zone 3.

The hydrocarbon reaction products, which are now substantially free of dissolved hydrogen fluoride and substantially free, or at least considerably reduced, in organically combined fluorine, are removed from the bottom of zone 29 through line 41 and are directed through line 42 containing valve 43 to further separation, as desired.

When the activity of the dehydrofluorinating catalyst is reduced to a value below that required for satisfactory dehydrofluorination, indicated by an increase in the amount of combined fluorides contained in the refined alkylation product, which generally occurs after the dehydrofluorination tower has been in operation over a considerable period of time ranging from several weeks to as much as a year or more of operation, the production of alkylate is discontinued, or the alkylation products are diverted into a secondary dehydrofluorinating tower similar to zone 29, but not shown on the accompanying diagram. To regenerate the primary dehydrofluorinating catalyst, it is treated with the hydrogen fluoride-containing reagent at the conditions hereinbefore specified. As heretofore indicated, the dehydrofluorinating catalyst may be regenerated by allowing the catalyst to stand in contact with the hydrogen fluoride-containing reagent or the catalyst may be continuously washed by the reagent until the desired activity has been restored. In the former method of operation substantially anhydrous liquid hydrogen fluoride or a hydrocarbon containing anhydrous hydrogen fluoride dissolved therein, such as isobutane saturated with hydrogen fluoride, is introduced into line 44 containing valve 45 which feeds into line 46 containing valve 47, said line emptying into charging tank 21. With valves 20 and 23 closed to prevent its flow into lines 22 and 19, the reagent is pumped by means of pump 26 through line 24, valve 25, line 27, and valve 28 into dehydrofluorinating zone 29 until the dehydrofluorinating catalyst is completely covered with the reagent. Valves 43, 48 and 49 are, of course, closed during this operation to prevent the reagent from flowing out of zone 29, and to permit the zone to be filled with reagent.

When it is desired to employ the continuous washing technique to restore the activity of the dehydrofluorinating catalyst, valves 49 and 43 are closed but valve 48 is open to allow continuous flow of the hydrogen fluoride reagent introduced through line 44 and removed through line 50. The reagent drawn from the system through line 50 and containing dissolved therein the deactivating resin formerly adhering to the dehydrofluorinating catalyst in zone 29 may be subjected to distillation to recover the useful components and to remove the resin therefrom.

The invention is further illustrated in the following example, although the operating conditions and other factors involved in the present invention which are stipulated therein should not be construed as limiting the invention in any of its aspects.

A dehydrofluorinating tower of an anhydrous hydrogen fluoride alkylation process, containing aluminum rings as a dehydrofluorinating catalyst, was opened after 245 days of continuous operation, and the catalyst inspected to determine the amount of deactivating material deposited thereon. The rings were covered with a layer of resin-like varnish in varying degrees of thickness, the varnish being practically insoluble in all of the organic solvents tried, including ethanol, benzene, acetone, and others. The dehydrofluorinating activity of the aluminum rings just prior to shut-down of the tower may be shown in the following table:

Fluorine content of alkylate prior to dehydrofluorination (weight percent fluoride in product as elemental fluorine) _____ 0.0531

Fluorine content of alkylate dehydrofluorinated with fresh aluminum rings (weight percent fluoride as fluorine) ___ 0.0012

Fluorine content of alkylate just prior to shut-down _____ 0.0217

The partially deactivated aluminum rings are then soaked in anhydrous hydrogen fluoride for 20 hours at room temperature and at sufficient pressure to maintain liquid phase, following which the rings are again tested for the dehydrofluorinating activity. The fluorine content, as weight per cent elemental fluorine, of the alkylate dehydrofluorinated by the reactivated aluminum rings is 0.0019 per cent.

I claim as my invention:

1. The process of reactivating a used metallic dehydrofluorinating catalyst which comprises contacting said catalyst to remove resinous deposits therefrom, with substantially anhydrous hydrogen fluoride at a pressure and temperature to maintain a liquid phase of the hydrogen fluoride.

2. The process of reactivating a used dehydrofluorinating catalyst containing metallic aluminum to remove resinous deposits therefrom, which comprises contacting said catalyst with substantially anhydrous hydrogen fluoride admixed with a hydrocarbon at a pressure and a temperature sufficient to maintain said reagent in liquid phase.

3. The process of claim 3 further characterized in that said catalyst is contacted with isobutane saturated with anhydrous hydrogen fluoride.

4. The process of reactivating a used dehydrofluorinating catalyst containing metallic aluminum to remove resinous deposits therefrom, which comprises contacting said catalyst with substantially anhydrous hydrogen fluoride at a pressure and temperature to maintain a liquid phase of the hydrogen fluoride.

ELMER R. KANHOFER.

REFERENCES CITED

The following references are of record in the file of this patent:

UNITED STATES PATENTS

| Number | Name | Date |
|---|---|---|
| 1,011,203 | Jahn | Dec. 12, 1911 |
| 2,343,841 | Burk | Mar. 7, 1944 |
| 2,366,743 | Matuszak | Jan. 9, 1945 |